United States Patent
Rathod

(10) Patent No.: US 9,172,795 B1
(45) Date of Patent: Oct. 27, 2015

(54) PHONE CALL CONTEXT SETTING

(71) Applicant: Microsoft Corporation, Redmond, WA (US)

(72) Inventor: Amit Nandkishore Rathod, Hyerabad (IN)

( * ) Notice: Subject to any disclaimer, the term of this patent is extended or adjusted under 35 U.S.C. 154(b) by 0 days.

(21) Appl. No.: 14/454,774

(22) Filed: Aug. 8, 2014

(51) Int. Cl.
  *H04M 1/56* (2006.01)
  *H04M 15/06* (2006.01)
  *H04M 3/42* (2006.01)

(52) U.S. Cl.
  CPC ...... *H04M 3/42093* (2013.01); *H04M 3/42042* (2013.01)

(58) Field of Classification Search
  CPC ............. H04M 3/42042; H04M 3/42059; H04M 3/436; H04M 1/57; H04M 15/06
  USPC ............. 379/142.01, 142.06, 142.1; 455/415
  See application file for complete search history.

(56) References Cited

U.S. PATENT DOCUMENTS

| | | | |
|---|---|---|---|
| 6,310,944 B1 * | 10/2001 | Brisebois et al. | 379/142.01 |
| 7,756,259 B2 | 7/2010 | Martin | |
| 8,140,057 B2 | 3/2012 | Grosch | |
| 2003/0133553 A1 | 7/2003 | Khakoo | |
| 2004/0208301 A1 * | 10/2004 | Urban et al. | 379/142.17 |
| 2006/0193448 A1 | 8/2006 | Donoghue | |
| 2006/0258388 A1 * | 11/2006 | Sato | 455/550.1 |
| 2007/0036284 A1 * | 2/2007 | Raghav et al. | 379/67.1 |
| 2010/0151839 A1 | 6/2010 | Krishnamurthy et al. | |
| 2011/0014900 A1 | 1/2011 | Gottfried | |
| 2012/0076285 A1 | 3/2012 | White | |
| 2014/0179288 A1 * | 6/2014 | Ashtikar | 455/415 |

* cited by examiner

*Primary Examiner* — Quoc D Tran
(74) *Attorney, Agent, or Firm* — Kate Drakos; Bryan Webster; Micky Minhas

(57) ABSTRACT

Example apparatus and methods concern establishing additional context for a call using pre-call information. The additional context is provided by a caller and used to determine, for example, whether and how to answer a call. An apparatus (e.g., smart phone, VoIP device) may be configured to augment an outgoing call with first context setting information (e.g., short message, picture, voice clip). The first context setting information may be embedded in the outgoing call or may be provided separately as part of a distinct communication. The apparatus may also be configured to acquire second context setting information associated with an incoming call. The second context setting information may be retrieved from the incoming call or may be retrieved using a separate communication that is triggered by the incoming call. The second context setting information may be presented in an integrated display that produces a single user interruption.

18 Claims, 18 Drawing Sheets

Apparatus 900

Incoming Call
555-000-2345

| Answer | Ignore |

"This is about membership
request for the country club..."

FIG. 9

Apparatus 1000

Incoming Call

| Answer | Ignore |

"This is about membership request for the country club..."

PHONE CALL CONTEXT SETTING

BACKGROUND

Smart phones and other devices (e.g., voice over internet protocol (VoIP) phones) have features that traditional phones do not have. However, people may not use these additional features. One reason why the additional features may not be used involves long-established habits associated with older phones. Regardless of the reason why the additional features are not used, users may be missing out on opportunities to improve their phone experience. For example, a user may not take advantage of stored contacts to display the name, number, photograph, and other identifying information that may be available for an incoming phone call. The identifying information could help a user decide whether to answer a call or whether to let it go to voice mail. Additionally, the identifying information could help a user customize their response (e.g., personal, professional) to a phone call. Similarly, a user may not take advantage of customized ring tones to facilitate identifying an incoming phone call. When a call is received from a number for which identifying information has not been stored, only the number may be displayed. This may leave the user with little, if any, information about whether to answer the phone. Additionally, when the call is answered, a period of time may be required to establish the context of the call. For example, the caller may have to identify themself and the purpose of their call.

Information stored on the receiving phone or elsewhere (e.g., telecommunications server) may facilitate partially setting the context for a phone call. For example, when a call is received for which a calling number is available, the familiar caller-id feature may be employed. In another example, when a call is received from a number for which identifying information has been stored, then that identifying information (e.g., name, photo, business) may be displayed. The identifying information may help the user decide whether to answer the phone. Additionally, the identifying information may help the user switch between mental tasks. For example a user may switch from thinking about a business matter to thinking about a family matter. The identifying information may also help the parties to the call save time since they may not need to identify each other. For example, if the person receiving the call already knows that the call is from their daughter, then the person receiving the call can answer "hello Emma" instead of simply saying "hello." Answering by name may save time because it establishes in the caller's mind that the person receiving the call already knows their identity.

Information stored on the receiving phone that is accessible through the phone number associated with an incoming call can help establish some context for an incoming call. The partial context can help a person receiving a call decide whether to answer the call. The context can also help a person receiving a call decide how to answer the call (e.g., formally, informally). The partial context can also help prepare a person receiving a call by allowing them to mentally change tasks from what they were doing to what the call may require. While an incoming telephone number and information stored in a receiving device associated with that incoming telephone number facilitate establishing some context for a phone call, additional context may provide an improved experience. The additional context may help establish new habits that take advantage of additional features in smart phones, telephone networks, and computers that support telephone calls.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods facilitate providing additional context for an incoming phone call. The additional context goes beyond conventional systems like caller id that rely only on information stored on the receiving device or elsewhere (e.g., telecommunications server) that can be retrieved based on a telephone number or other identifier associated with an incoming call. Example apparatus and methods facilitate providing additional context by allowing the caller to provide additional information that can be presented before a person receiving a call answers the phone. The additional information may be, for example, a text-based message, a photograph, a voice message, or other information. In one embodiment, the additional information may be collected from the caller in a single, seamless interaction with a single interface on the calling device. The additional information may be provided in an integrated presentation along with the notice of the incoming call so that the user only experiences a single interruption.

Example apparatus and methods may be configured to allow a user making a call to provide additional information that can be presented to the person being called. In one embodiment, a caller may dial the number to be called and then, in a seamless experience, be prompted to provide additional information from which context can be established. If the caller does not want to provide additional information, then the call may be initiated as normal. If the caller does want to provide additional information, then the call may be delayed while the additional information is acquired. The additional information may be, for example, a short text-based message to be displayed along with the phone call, a graphic (e.g., business logo, subject matter of call), a voice-based message (e.g., this call is about the used car you looked at yesterday), or other item. Once the additional information is acquired, the call may be dialed and the additional information or an indication that additional information is available may be provided.

In one embodiment, the additional information may be packaged with the outgoing call and provided as part of the incoming call. In this embodiment, the receiving device may decide whether to receive and present the additional information. In another embodiment, the additional information may not be packaged with the outgoing call but may be provided using a separate mechanism. For example, the outgoing call may be made in a conventional way and a second outgoing communication may also be transmitted. The second outgoing communication may be stored, for example, by a cloud service that makes the additional information available to receiving devices or users. In this embodiment, the incoming phone call may be received by the receiving device in a conventional manner and then the cloud service may be queried to see whether there is additional information available. Querying the cloud service may be performed before the receiving device starts ringing, while the phone is ringing, or at other times. While a cloud service is described, the information provided in the second outgoing communication may be stored in other locations.

By making additional information available, either as part of an incoming call, or using a separate mechanism, not only will the person receiving the call have available identifying information (e.g., telephone number, online name, user name, online number, VoIP identifier) and information stored on the receiving device or elsewhere associated with the identifying information (e.g., name), but the person receiving the call may also have available the additional information that facilitates establishing a more complete context for the incoming call and an improved phone experience.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

FIG. 9 illustrates an example screen shot.

DETAILED DESCRIPTION

Figure 1:
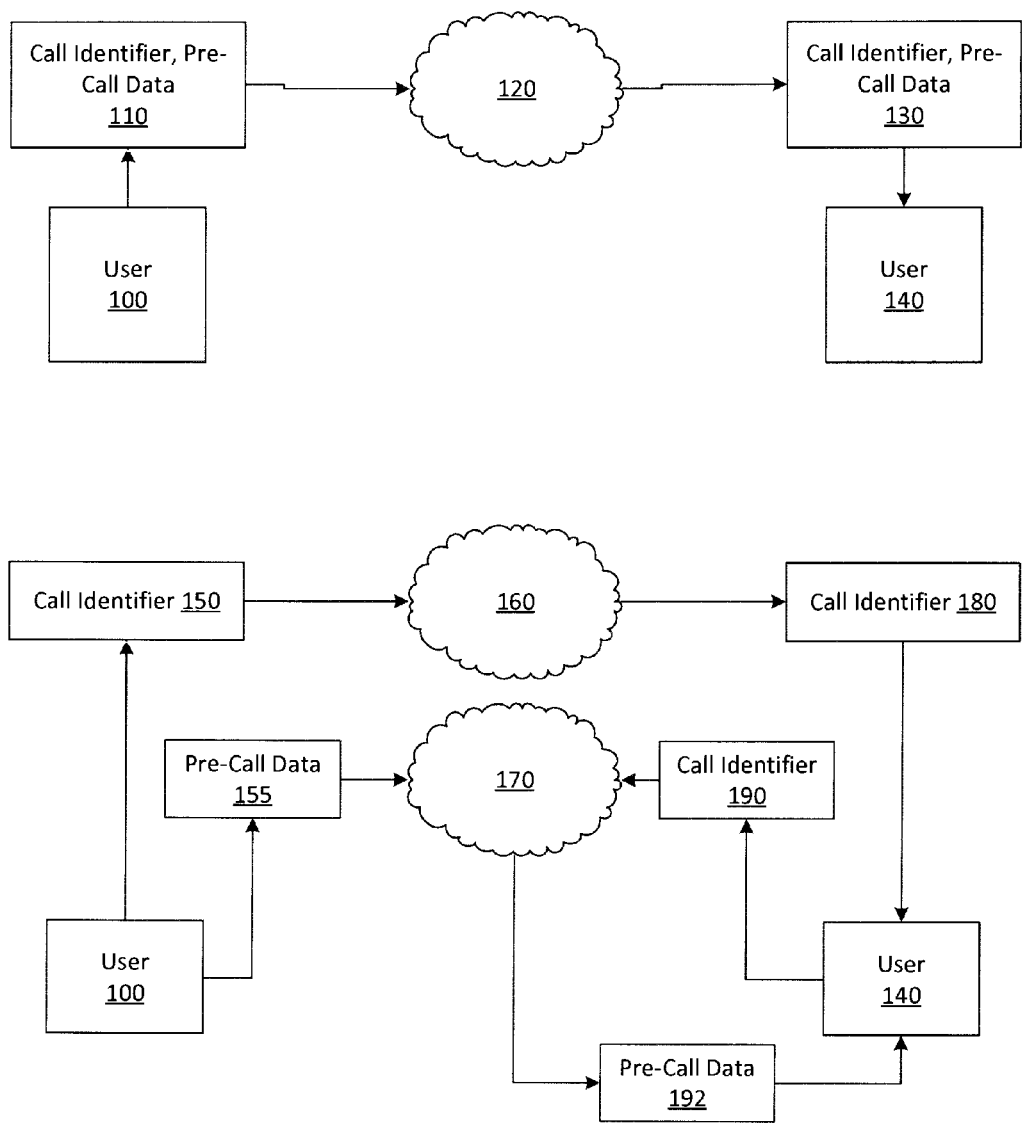
FIG. 1 illustrates two example paths for data communications associated with establishing context for a telephone call.

FIG. 1 illustrates two example paths for data communications associated with establishing context for a call. A user 100 may wish to call a user 140. Unlike conventional systems where user 100 just dials a number or provides an online number, user name, clicks a link, selects a contact from a contact list or otherwise selects an intended receiver for an outgoing call, user 100 may be able to take additional actions to facilitate establishing more complete context for the call with user 140. User 100 may provide additional information that is presented to user 140 in an integrated presentation that causes only a single interruption for user 140. Conventionally, if user 100 wanted to let user 140 know what an impending call dealt with, user 100 might first send a text message or email providing the context and then call a little while later. A text message followed by a phone call would not be an integrated presentation and would produce two interruptions for the user 140. Similarly, an email followed by a phone call would produce two interruptions and not provide an integrated display. Additionally, since the two interruptions may be separated in time, user 140 may spend time unnecessarily waiting for the call or may be interrupted with some other task before the call arrives. Additionally, conventionally, a phone call may be interrupted by a text message, providing a sub-optimal user experience.

Thus, in one example, user 100 may provide the identifier and pre-call information using a single communication 110 to a telephony system 120. The call number and pre-call information may then be provided to user 140 in a single communication 130. In one embodiment, user 100 may enter the identifier and pre-call information in a single seamless interaction. In another embodiment, where only the receiving phone has the additionally capability, even though the caller may perform two separate actions to build the call, the receiver may still receive the call and context in a single interruption.

In another example, user 100 may provide the identifier of the intended receiver using a first communication 150 to a telephony system 160 and may provide the pre-call data using a second communication 155 to a second data communication system 170. The identifier of the intended receiver may then be provided to user 140 using a communication 180 and the pre-call data may be acquired by the user 140 using a query 190 to second data communication system 170. The query 190 may retrieve the pre-call data in a separate data communication 192.

In either example, the identifier of the intended receiver and the pre-call information are provided to user 140 in an integrated presentation that produces only a single interruption for the person receiving the call. The integrated presentation may allow user 140 to determine whether and how to answer the call, and may prepare the user to jump right into the call without having to be brought up to speed.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
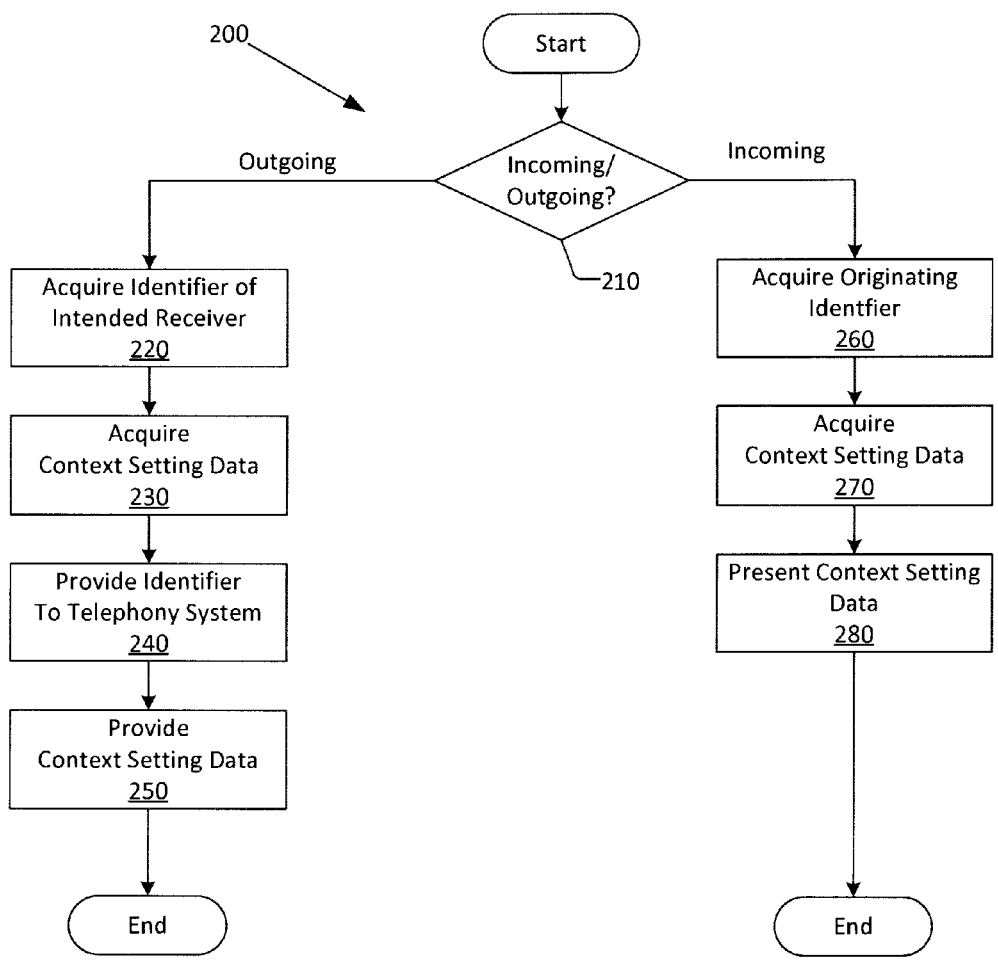
FIG. 2 illustrates an example method associated with establishing context for a telephone call.

FIG. 2 illustrates an example method 200 associated with establishing context for a call. The call may be, for example, a telephone call, a cellular telephone call, a satellite phone call, a VoIP call, or other type of call. In different examples, method 200 may be performed on a single device, may be performed partially or completely in the cloud, may be performed on distributed co-operating devices, or may be performed other ways. In different examples, method 200 may be performed on devices including, but not limited to, a computer, a laptop computer, a tablet computer, a phone, and a smart phone.

Method 200 includes, at 210, determining whether a device or process is making an outgoing call or is receiving an incoming call. The device may be, for example, a cellular telephone, a network telephone, a satellite telephone, or another type of telephone or device acting as a telephone such as a device providing VoIP services.

If the determination at 210 is that the user is making an outgoing call, then method 200 may proceed, at 220, to acquire, in the device being used to make the outgoing call, an identifier of a receiver of the outgoing call. Acquiring the identifier may include inputting key presses from a touch screen, inputting a speed dial key press, receiving a selection of a contact from an address book or other contact management application, inputting a voice command and retrieving an associated phone number, selecting a contact from a contact list, clicking on a link, selecting from a graphical user interface element, and other actions.

Method 200 may also include, at 230, acquiring context setting data associated with the outgoing call. The context setting data may be acquired from the user and stored in the device. A user may be, for example, a human user, or a machine user. The context setting data associated with the outgoing call may include, but is not limited to include, text-based data, video-based data, image-based data, or voice-based data. Acquiring the context setting data may include receiving key presses, receiving a voice command, receiving an electronic communication (e.g., short message service (SMS), email), or other action. In one embodiment, method 200 may include controlling the device to convert voice-based data to text-based data before providing the context setting data associated with the outgoing call to a communication system. The context setting data may include, for example, the purpose of the call, the urgency of the call, a photograph of an item or person to be discussed during the call, an identifier of a document to be discussed, or other information. The context setting data does not include the conventional caller number or identifier since that information may already be available from other sources.

Method 200 may also include, at 240, providing the identifier to a telephony system. The telephony system is configured to make a telephone call to a receiving device associated with the identifier. The telephony system may be, for example, the plain old telephone system (POTS), a cellular telephony system, a network telephony system (e.g., voice over internet protocol (VoIP)), a satellite telephony system, or other telephony system. Providing the identifier to the telephony system at 230 may cause the telephony system to attempt to establish a call to the receiver, device, or process associated with the identifier. The identifier may be provided using electrical signals, optical signals, computer data, or in other ways.

Method 200 may also include, at 250, providing the context setting data associated with the outgoing call to a communication system configured to make the context setting data available to the intended receiver. In one embodiment, the communication system may be the same system used for providing the identifier (e.g., the telephony system). In another embodiment, the communication system may be a different system that is independent from the telephony system. For example, the outgoing call may be routed over a cellular telephone system while the additional context setting data may be routed over a network telephone system or other messaging system (e.g., SMS, email). Although the incoming information is to be presented in an integrated presentation that will cause the receiver to experience only a single interruption, in some embodiments, the outgoing information may be provided through separate systems using separate communications, separate channels, separate protocols, and other independent elements. Although the outgoing information may be provided by separate systems, in one embodiment the outgoing information may be collected using the same interface employed to initiate the outgoing call.

In one embodiment, where separate communications or communication systems are employed, the context setting data associated with the outgoing call may be provided to the communication system at 250 at least partially in parallel with the identifier being provided to the telephony system at 240.

In one embodiment, the outgoing information may be provided to an Internet-based service that will store the outgoing information and make the outgoing information available to the receiving device. In different embodiments, the outgoing information may be pushed from the Internet-based service to the receiving device or may be pulled from the Internet-based service by the receiving device. In one embodiment, the outgoing information may be used more than one time for more than one call. For example, a caller may make a call that is not answered. If the outgoing information is still stored, then the outgoing information may be used at a later time to repeat the call without having to be re-entered at the originating device.

If the determination at 210 was that the phone was receiving an incoming call, then processing may continue at 260 by acquiring an identifier of an initiator of the outgoing call that produced the incoming call originated. In one embodiment, the identifier of the initiator may be acquired from the telephony system as part of the incoming call. For example, the identifier of the initiator may be retrieved from a field or fields or packet or packets in an incoming call. The identifier of the initiator may also be acquired from electrical signals, optical signals, audio signals, pulses, or in other ways.

Method 200 may also include, at 270, acquiring context setting data associated with the incoming call. The context setting data associated with the incoming call may include, but is not limited to including, text-based data, video-based data, image-based data, or voice-based data. In one embodiment, the context setting data may be acquired from the telephony system that is handling the incoming call. For example, the context setting data may be provided as a field or fields in a packet or packets associated with a packetized telephony system. In another embodiment, the context setting data may be acquired from a system separate from the telephony system. This acquisition may be a push received from the separate system or may be a response to a query made by the receiving phone to the separate system. Once the phone number and the context setting data are available, then the information may be presented as an integrated set of information that only generates a single interruption of the receiver.

In one embodiment, where separate communications or communication systems are employed, the context setting data associated with the incoming call may be acquired from the communication system at 270 at least partially in parallel with the identifier of the initiator being acquired from the telephony system at 260. When separate communications or systems are employed to acquire the context setting data associated with the incoming call, the receiving device or process may delay indicating the incoming call (e.g., delay ringing the phone) until the context setting data is acquired or until a determination is made that context setting data is unavailable.

Method 200 may also include, at 280, presenting the identifier of the initiator from which the incoming call originated or the context setting data associated with the incoming call. When the receiving device or process has stored information (e.g., photo) associated with the identifier of the initiator, then the receiving device or process may choose to not display the identifier of the initiator. The presentation may be made by the receiving device or process as an integrated presentation that produces a single interruption to a user. Rather than receiving a text message (e.g., SMS) at a first time and then receiving a telephone call at a second time, the receiver may be presented with the information available about the call (e.g., calling number) and the additional context setting information at the same time through a common user interface. The integrated presentation may allow the user to decide whether to answer the call, may allow the user to decide how to answer the call, and may allow the user a few mental seconds to prepare for the call. The integrated presentation may also facilitate making different types of responses including a text message response, an email response, a voice mail response, or other response.

Figure 3:
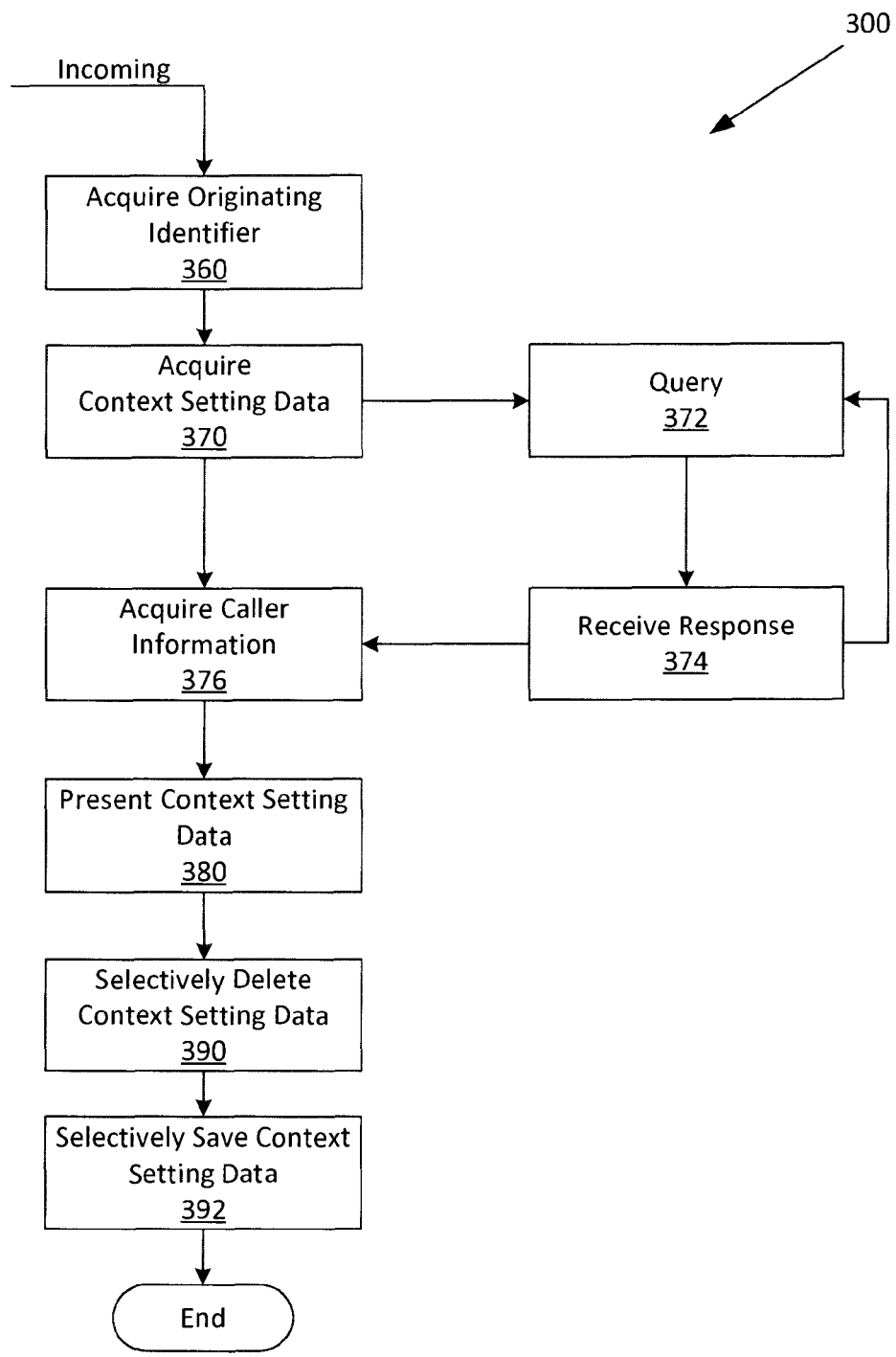
FIG. 3 illustrates portions of an example method associated with establishing context for a telephone call.

FIG. 3 illustrates portions of an example method 300 associated with establishing context for a call. The illustrated portion of method 300 deals with an incoming call. Method 300 has some actions similar to method 200 (e.g., acquiring originating identifier at 360, acquiring context setting data at 370, and making an integrated presentation at 380). However, method 300 includes additional actions and provides additional detail concerning acquiring the context setting data at 370.

This portion of method 300 illustrates how acquiring the context setting at 370 may include sending a query or other communication at 372. The query may be sent, for example, to an Internet-based service that is storing the context setting information. Method 300 may also include, at 374, receiving data in response to the query or other communication sent at 372. While a single request and response are illustrated, multiple requests and responses may be employed as indicated by the arrow returning to 372 from 374. The query or other communication may be, for example, an SMS message, an email, a separate phone call, a network communication, or other communication. In one embodiment, the query may be received by a service (e.g., cloud service) that is storing context setting data. In different embodiments a service may store context setting data for one call from one initiator or may store context setting data for multiple calls from multiple initiators. The service may respond to a query from a receiver by providing the stored context setting data.

In one embodiment, method 300 may also include, at 376 acquiring caller information stored at the receiver. This caller information may include, for example, a ring tone, a photograph, a business card, a note, or other information. This call information is associated with the initiator identifier. The caller information may also be included in the integrated presentation made to the receiver of the incoming call. In one embodiment, when caller information is available, the caller information may be provided as well as or instead of the initiator identifier.

In one embodiment, method 300 may also include, at 390, deleting the initiator identifier or the context setting data associated with the incoming call upon determining that the incoming call has been accepted, declined, or completed. Since the identifier, context setting data, and even caller information were provided as an integrated presentation, in one embodiment, all the information may be deleted as a single action that is either automated or manually completed. Compare this single action to an approach where the user first received an SMS text or email and then received a call. Not only would the receiver have to answer the call, but the user would also have to delete the text message or email. Allowing a user to take a single action may provide a more optimal user experience than requiring a user to take several actions.

Additionally, method 300 may include, at 392, storing the context setting data associated with the incoming call. The data may be stored upon determining that the incoming call will not be answered. In one embodiment, the form factor (e.g., voice, text, image) of the incoming context setting data may be preserved, while in another embodiment the incoming context setting data may be converted to a different format (e.g., voice to text).

While FIGS. 2 and 3 illustrates various actions occurring in serial, it is to be appreciated that various actions illustrated in FIGS. 2 and 3 could occur substantially in parallel. By way of illustration, a first process could handle outgoing call data and a second process could handle incoming call data. While two processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 200. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 4:
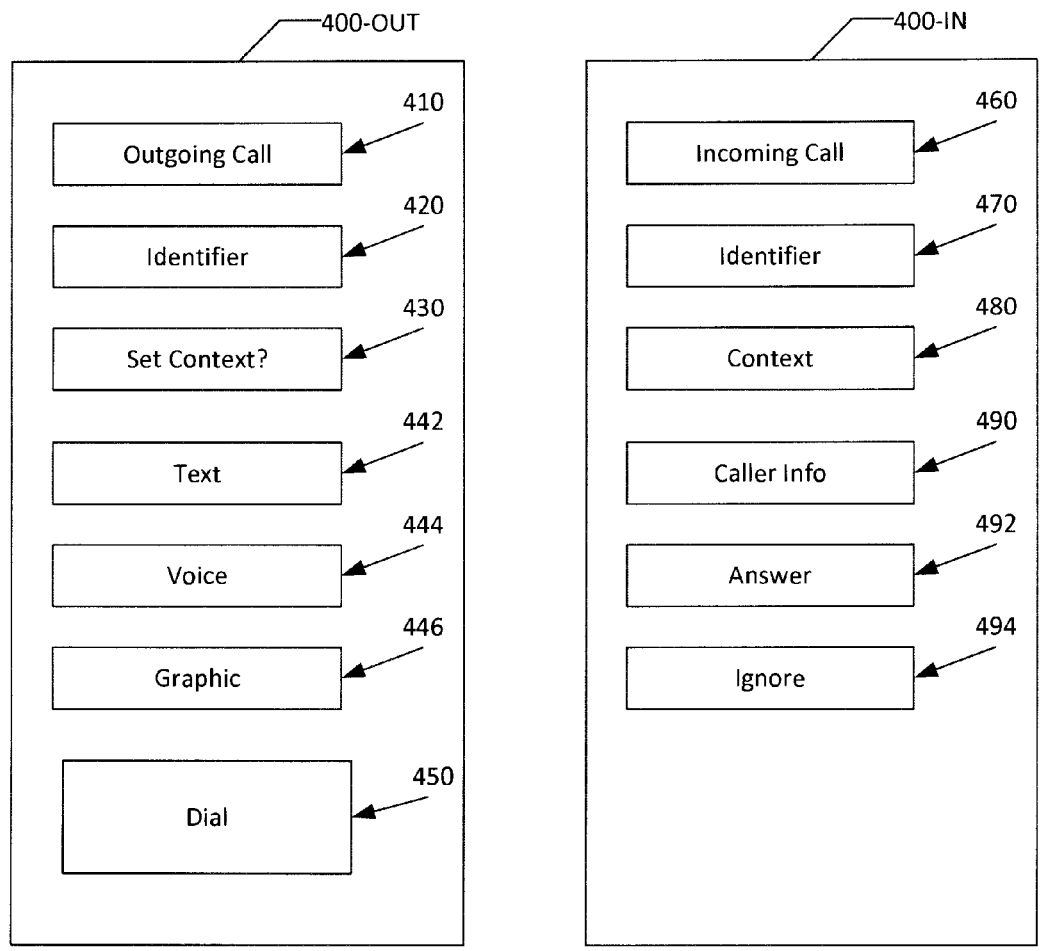
FIG. 4 illustrates two example screens that may appear on a telephone configured to establish context for a telephone call.

FIG. 4 illustrates two example screens that may appear on a telephone that is configured to establish context for a telephone call. Additional screens are displayed in FIGS. 9-11. Screen 400-OUT, which appears on the left, is an example of a screen that might be used to supplement an outgoing call. Screen 400-IN, which appears on the right, is an example of a screen that might be seen when a context-setting call is received.

Screen 400-OUT includes a notice 410 that identifies to the user that they are building an outgoing call. Rather than just entering an identifier (e.g., telephone number, online number, online name, user name, VoIP identifier) into a number field 420, and then pressing an action button 450 (e.g., dial), the user may take additional actions. For example, the user may press a button 430 that identifies that the user wants to provide additional context information. The user may then select between buttons 442, 444, and 446 to initiate entry of text, voice, or graphic data respectively. While text, voice, and graphic choices are presented, different choices or combinations of choices may be provided. While buttons are illustrated on screen 400-OUT and screen 400-IN, other user interface elements may be employed. Screen 400-OUT is just one example of how an outgoing call may be built. In other examples, a user may not enter an identifier but rather may select an identifier. The identifier may be selected by, for example, picking from a contact list, picking from an address book, clicking on a graphic user interface element (e.g., photo), clicking on a callback link, selecting a point of interest from a map, or other action.

Screen 400-IN includes a notice 460 that identifies to a user that they are receiving an incoming call. The originating identifier may be displayed in a number field 470. The user may also be presented with familiar action buttons 492 and 494 to facilitate answering or ignoring the call respectively. In another example, buttons or other graphical user elements may faciliate taking other actions including, but not limited to, sending a text message reply, sending an email, sending a voice message, or sending a video reply. However, the user may also be presented with additional context setting information. For example, text, images, graphics, or other displayable data may be presented in field 480. Additionally, if a voice message has been attached to the context setting data, then the user may hear the voice message while the phone is ringing. Additionally, the user may be presented with caller information already stored in the phone, such as information from a contact record. Recall that caller information may be associated with the originating identifier. Consider how screen 400-IN provides not just the identifier number but also the context setting information in a single integrated presentation that facilitates producing just a single interruption for a person receiving the call. With just a glance at their phone, or a single audible interruption, the person receiving the call may know who is calling and what they want, which may improve the user's experience with the phone.

Figure 5:
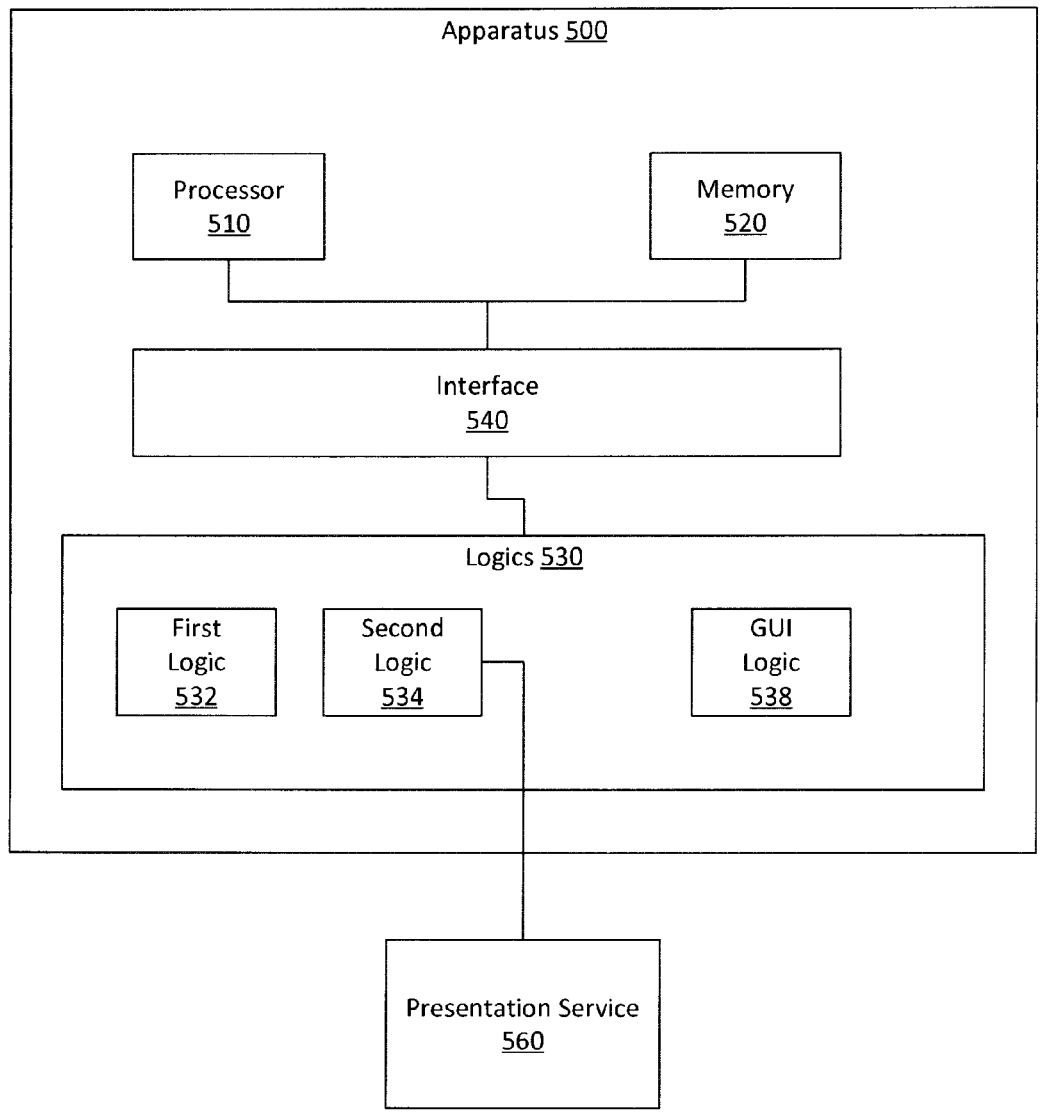
FIG. 5 illustrates an example apparatus configured to process pre-call information for a telephone call.
Figure 8:
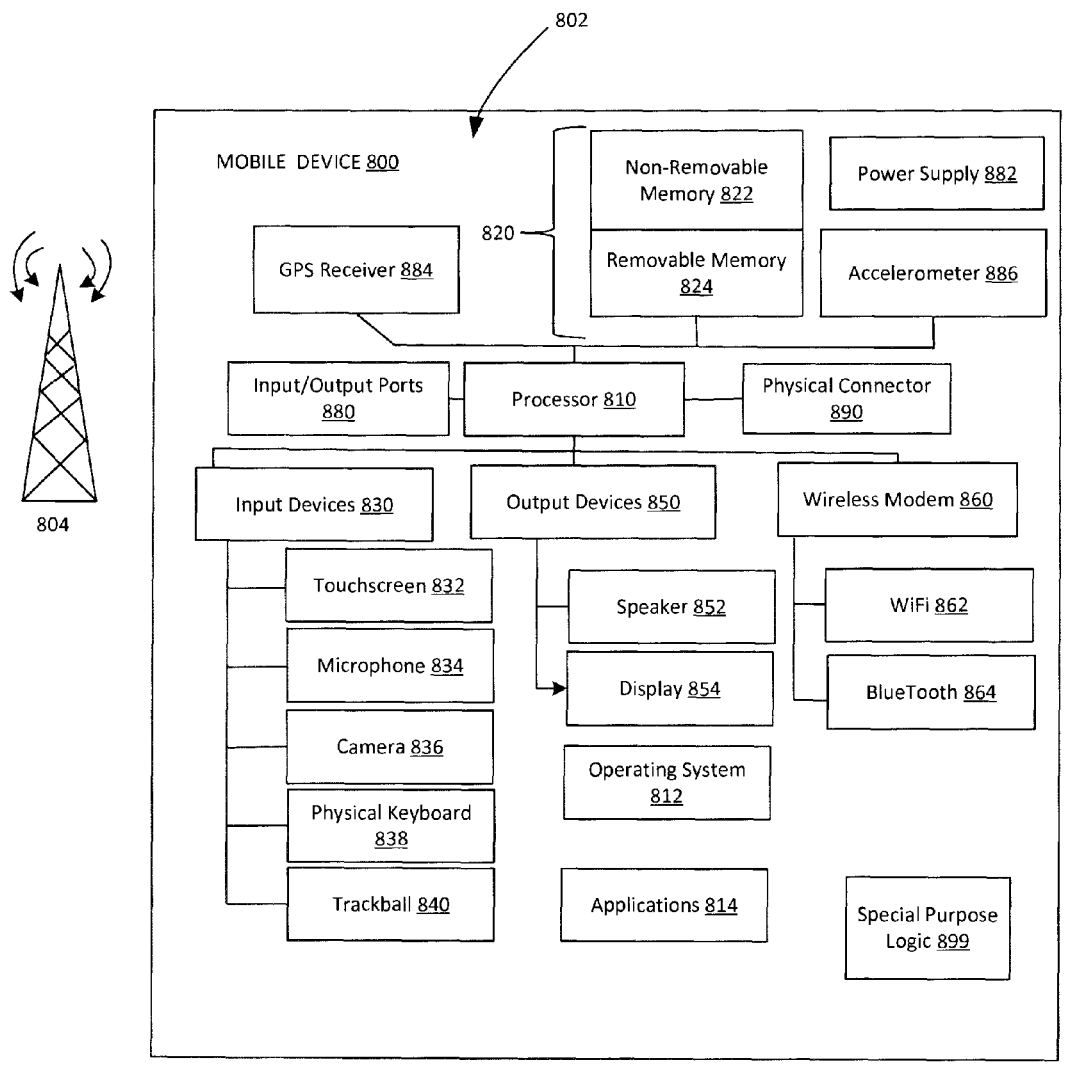
FIG. 8 illustrates an example mobile computing device configured to participate in pre-call context setting.

FIG. 5 illustrates an apparatus 500 that includes a processor 510, a memory 520, a set 530 of logics, and an interface 540 that connects the processor 510, the memory 520, and the set 530 of logics. The set 530 of logics may be configured to process pre-call information for a call handled by apparatus 500. Apparatus 500 may be, for example, a computer, a laptop computer, a tablet computer, a personal electronic device, a smart phone, or other device that can access and process data or calls. FIG. 8 illustrates one example of a phone.

In one embodiment, the apparatus 500 may be a general purpose computer that has been transformed into a special purpose computer through the inclusion of the set 530 of logics. The set 530 of logics may be configured to facilitate improving context setting for a device by processing pre-call information for a call handled by apparatus 500. The pre-call information provides user-discernible information sufficient to establish context for the incoming call in a single interruption without answering the incoming call. The set of logics 530 may also be configured to facilitate building an outgoing call and initiating the outgoing call through a single interface. Apparatus 500 may interact with other apparatus, processes, and services through, for example, a computer network.

The set 530 of logics may include a first logic 532 that is configured to supplement an outgoing call with outgoing pre-call information. In one embodiment, the first logic 532 may be configured to provide the outgoing pre-call information as part of the outgoing call using the same data communication used to make the outgoing call. For example, the first logic 532 may initiate a phone call using a conventional telephony system. In this example, the first logic 532 may embed the outgoing context setting data in a field or fields in a packet or packets associated with the conventional telephony system.

In another embodiment, the first logic 532 may be configured to provide the outgoing pre-call information as part of a separate data communication than was used to make the outgoing call. For example, the first logic 532 may initiate a call using a conventional telephony system but then send the outgoing pre-call information in a different communication using a different communication method.

The set 530 of logics may also include a second logic 534 that is configured to acquire incoming pre-call information associated with an incoming call. In one embodiment, the second logic 534 may be configured to acquire the second pre-call information from the same data communication used to make the incoming call. For example, the second logic 534 may be configured to find a field or fields in a packet or packets associated with an incoming call and to parse out the pre-call information.

In another embodiment, the second logic 534 may be configured to acquire the second pre-call information using a separate data communication than was used to make the incoming call. For example, the second logic 534 may detect the incoming call on a first communication circuit (e.g., cellular telephone) and then use a second communication method to acquire the additional context setting data information available in the pre-call data.

In different embodiments, some processing may be performed on the apparatus 500 and some processing may be performed by an external service or apparatus. Thus, in one embodiment, apparatus 500 may also include a communication circuit that is configured to communicate with an external source to facilitate processing pre-call information. In one embodiment, the second logic 534 may interact with a presentation service 560 to facilitate displaying data using different presentations for different devices.

In one embodiment, apparatus 500 may also include a third logic 536 that is configured to present a graphical user interface (GUI) for the apparatus. The third logic 536 may be configured to accept inputs from one or more different communications and to present the information in a single seamless presentation through a single interface. Similarly, the third logic 536 may be configured to acquire context setting information from a caller through a single interface. While a GUI is described, it is to be appreciated that voice and other inputs and outputs may also be processed by the third logic 536.

Figure 6:
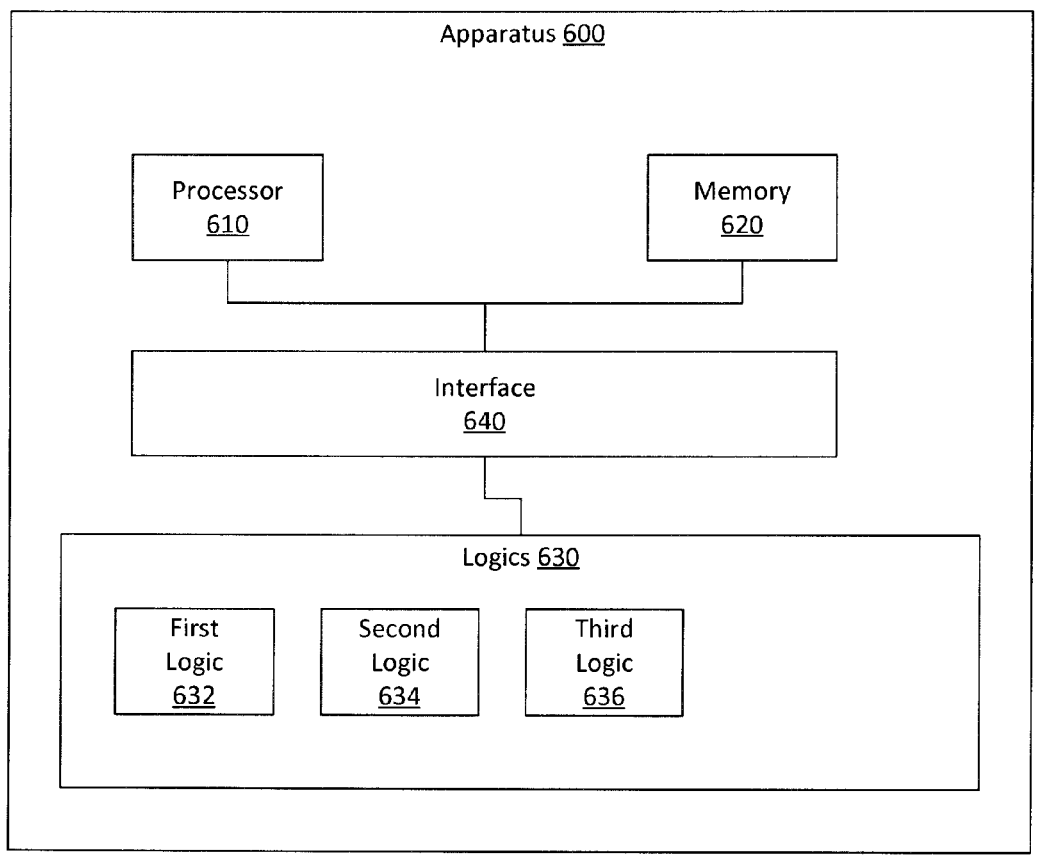
FIG. 6 illustrates an example apparatus configured to process pre-call information for a telephone call.

FIG. 6 illustrates an apparatus 600 that is similar to apparatus 500 (FIG. 5). For example, apparatus 600 includes a processor 610, a memory 620, a set of logics 630 (e.g., 632, 634) that correspond to the set of logics 530 (FIG. 5) and an interface 640. However, apparatus 600 includes an additional third logic 636. The third logic 636 may be configured to control the first logic 632 to store the outgoing pre-call information using an Internet-based service. Additionally, the third logic 636 may be configured to control the second logic 634 to retrieve the incoming pre-call information from the Internet-based service. Thus, apparatus 600 may interact with a cloud service that facilitates providing and retrieving pre-call information. Interactions with the cloud service may include pushing data (e.g., outgoing call context) to the cloud and pulling or otherwise receiving data (e.g., incoming call context) from the cloud. Interactions with the cloud may also be controlled by the cloud server.

Figure 7:
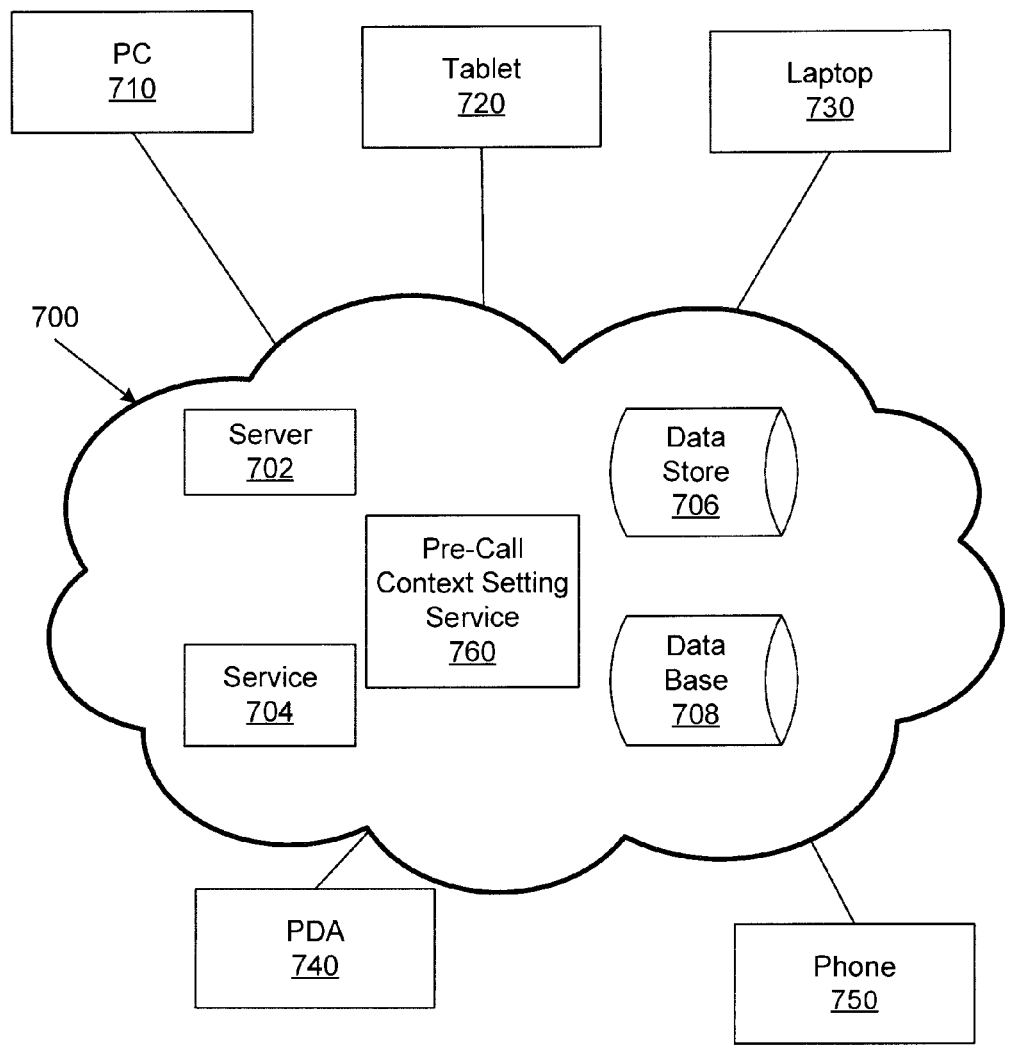
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example pre-call context setting service 760 residing in the cloud. The pre-call context setting service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the pre-call context setting service 760.

FIG. 7 illustrates various devices accessing the pre-call context setting service 760 in the cloud. The devices include a computer 710, a tablet 720, a laptop computer 730, a personal digital assistant 740, and a mobile device (e.g., cellular phone, satellite phone) 750. The pre-call context setting service 760 may receive and store pre-call information that is then available to devices including a device receiving an incoming phone call. By storing the pre-call context setting data using service 760, a caller may be able to recycle or reuse outgoing context setting information. This may be valuable to, for example, marketing callers, political callers, emergency service callers, or other callers who will make the same call about the same subject to multiple people. Additionally, by storing the pre-call context setting data using service 760, a caller may be able to queue up a number of calls to be made at a later time.

It is possible that different users at different locations using different devices may access the pre-call context setting service 760 through different networks or interfaces. In one example, the pre-call context setting service 760 may be accessed by a mobile device 750. In another example, portions of pre-call context setting service 760 may reside on a mobile device 750.

FIG. 8 illustrates an example mobile device 800. While FIG. 8 illustrates a mobile device 800, the embodiment is not intended to limit other more general apparatus described in, for example, FIGS. 5 and 6. While a mobile device 800 is illustrated, context setting may also be practiced by devices including computers, tablets, voice over internet protocol devices, and other computing devices.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 can be a variety of computing devices (e.g., cell phone, smartphone, handheld computer, Personal Digital Assistant (PDA), etc.) and can allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include RAM, ROM, flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, RF filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a GSM network for data and voice communications within a single cellular network, between cellular networks, or between the mobile device and a public switched telephone network (PSTN).

The mobile device 800 may include at least one input/output port 880, a power supply 882, a satellite navigation system receiver 884, such as a Global Positioning System (GPS) receiver, an accelerometer 886, or a physical connector 890, which can be a USB port, IEEE 1394 (FireWire) port, RS-232 port, or other port. The illustrated components 802 are not required or all-inclusive, as other components can be deleted or added.

Mobile device 800 may include a special purpose logic 899 that is configured to provide a functionality for the mobile device 800. For example, logic 899 may provide a client for interacting with a service (e.g., service 760, FIG. 7), or for handling pre-call information sufficient to establish context for a phone call in a single interruption without answering the phone call.

FIG. 9 illustrates an example screen shot on an apparatus 900. Apparatus 900 is displaying a screen that may be seen by a receiver when an incoming call arrives from an unknown caller. The phone number or other identifier (e.g., online name, user name) may be displayed along with an indicator that there is an incoming call. The user may also be presented with buttons to answer, ignore, or otherwise handle the call. The text string at the bottom of the screen shot provides context that may help the receiver of the call decide whether and how to respond to the incoming call. The text string at the bottom of the screen shot may have been entered by the caller using a voice to text conversion interface element, by typing in the message, or in other ways.

Figure 10:
FIG. 10 illustrates an example screen shot.

FIG. 10 illustrates an example screen shot on an apparatus 1000. Apparatus 1000 is displaying a screen that may be seen by a receiver when an incoming call arrives from a known caller. Instead of displaying an identifier like a phone number or user name, other information (e.g., photograph) associated with the caller may be displayed.

Figure 11:
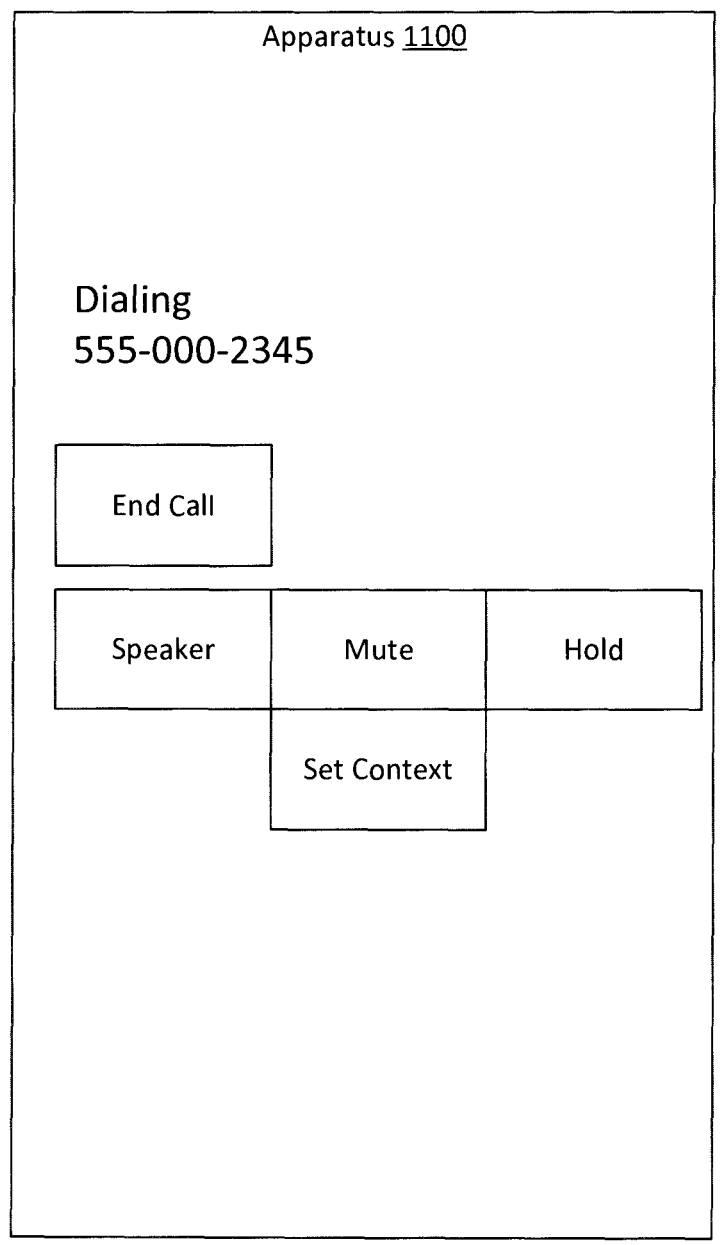
FIG. 11 illustrates an example screen shot.

FIG. 11 illustrates an example screen shot on an apparatus 1100. Apparatus 1100 is displaying a screen that may be seen by a caller while they are building a call that includes context setting data. The caller may decide to set the context by, for example, pressing the set context button.

Figure 12:
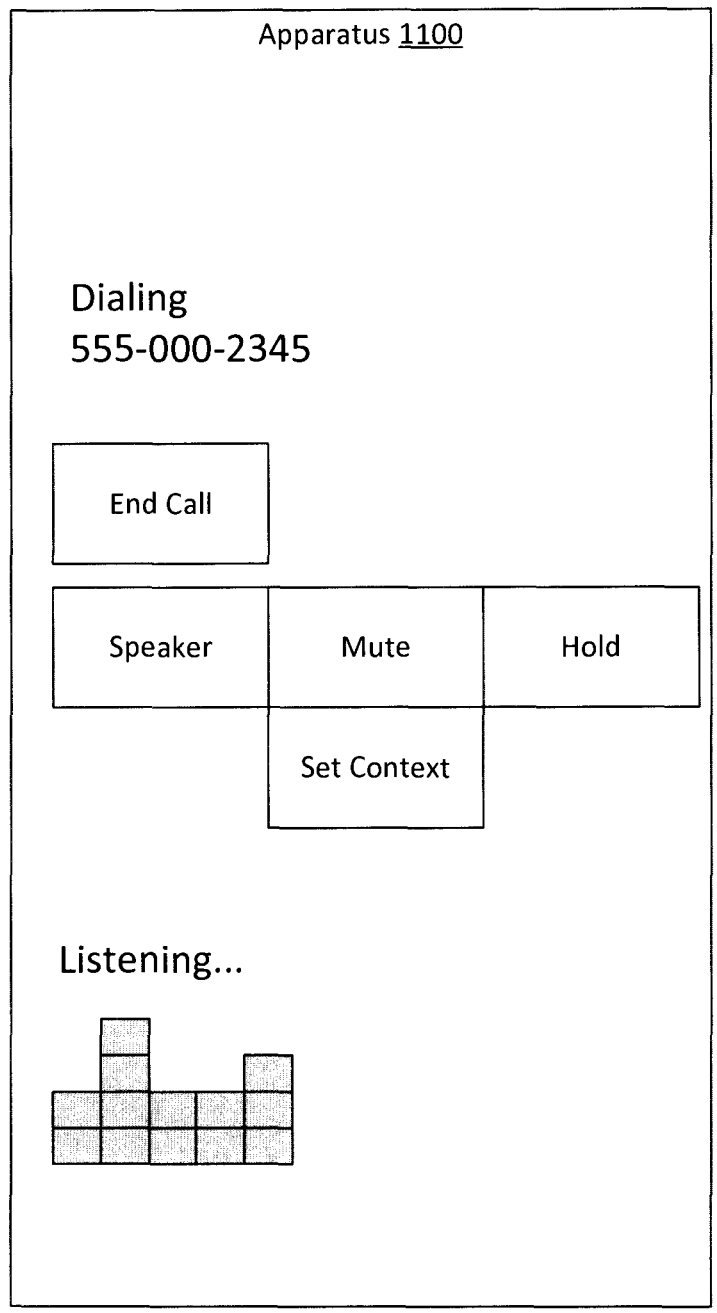
FIG. 12 illustrates an example screen shot.

FIG. 12 illustrates an example screen shot on apparatus 1100 after the caller has clicked the set context button. In this example, the device may now be listening to a voice message being input by the caller.

Figure 13:
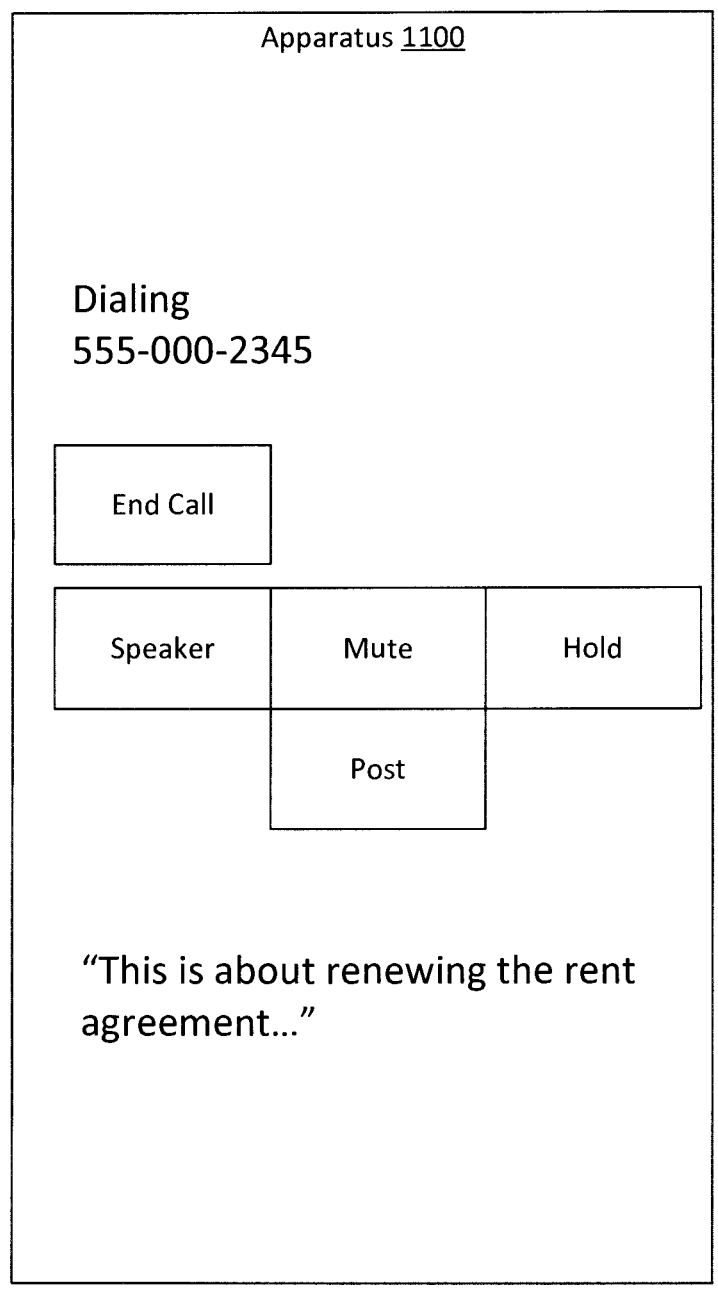
FIG. 13 illustrates an example screen shot.

FIG. 13 illustrates an example screen shot on apparatus 1100 after the caller has finished inputting their voice message. The user may now decide to include the voice message, as either voice or text, by clicking the post button. Notice how FIGS. 11-13 illustrate how the user is able to build the call and set the context using a single interface.

Figure 14:
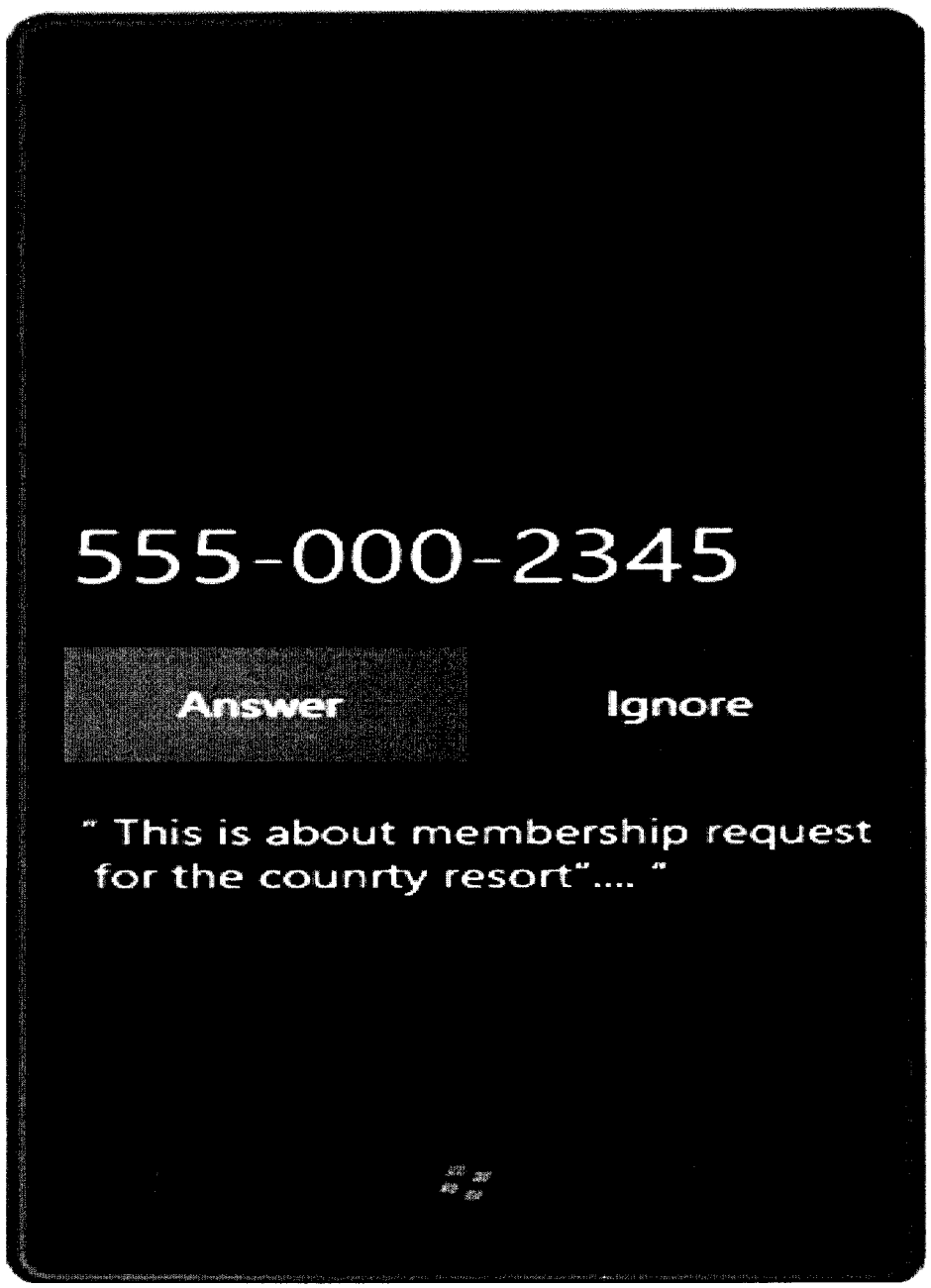
FIG. 14 illustrates an actual screen shot corresponding to the example screen shot illustrated in FIG. 9.

FIG. 14 illustrates an actual screen shot corresponding to the example screen shot illustrated in FIG. 9.

Figure 15:
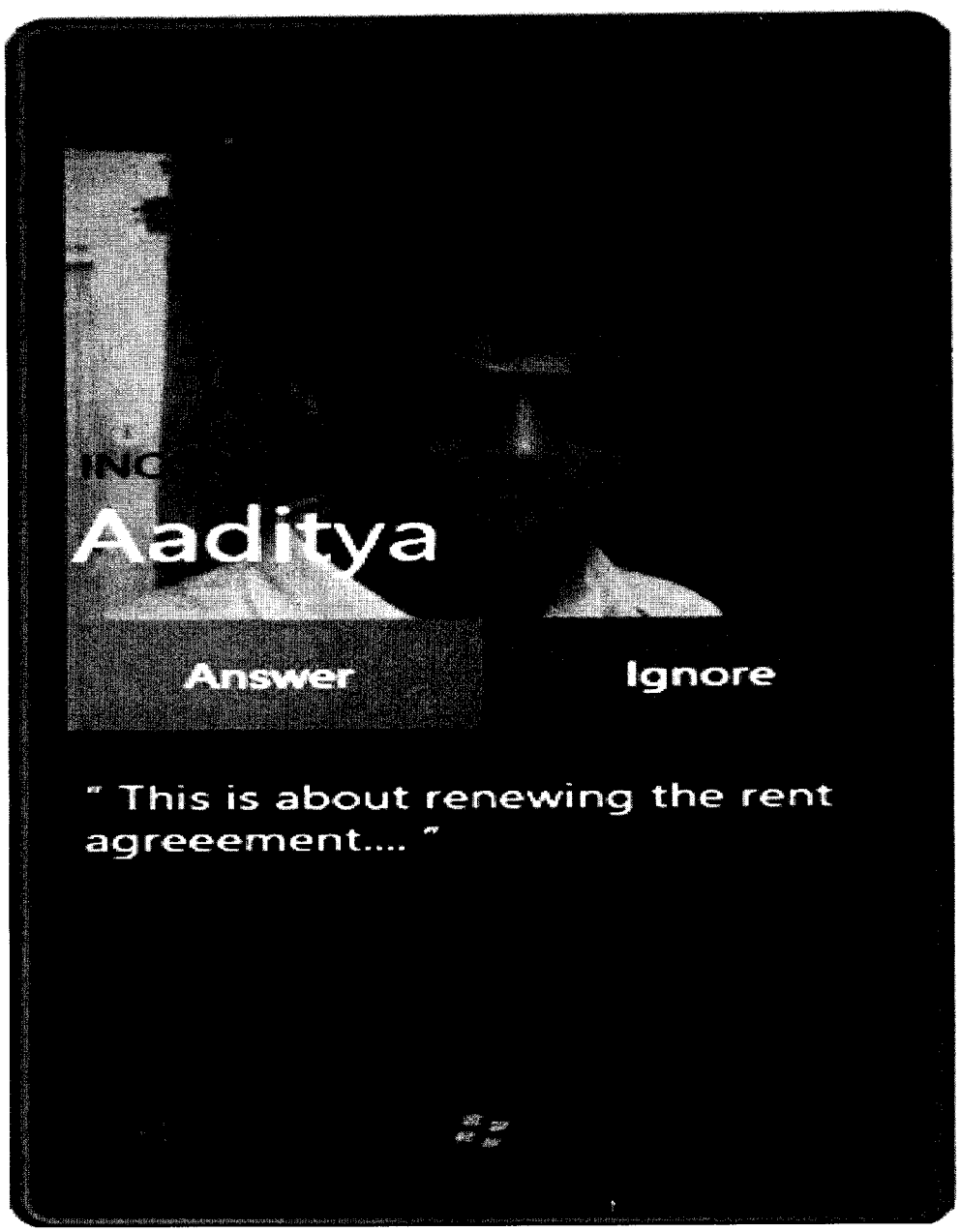
FIG. 15 illustrates an actual screen shot corresponding to the example screen shot illustrated in FIG. 10.

FIG. 15 illustrates an actual screen shot corresponding to the example screen shot illustrated in FIG. 10.

Figure 16:
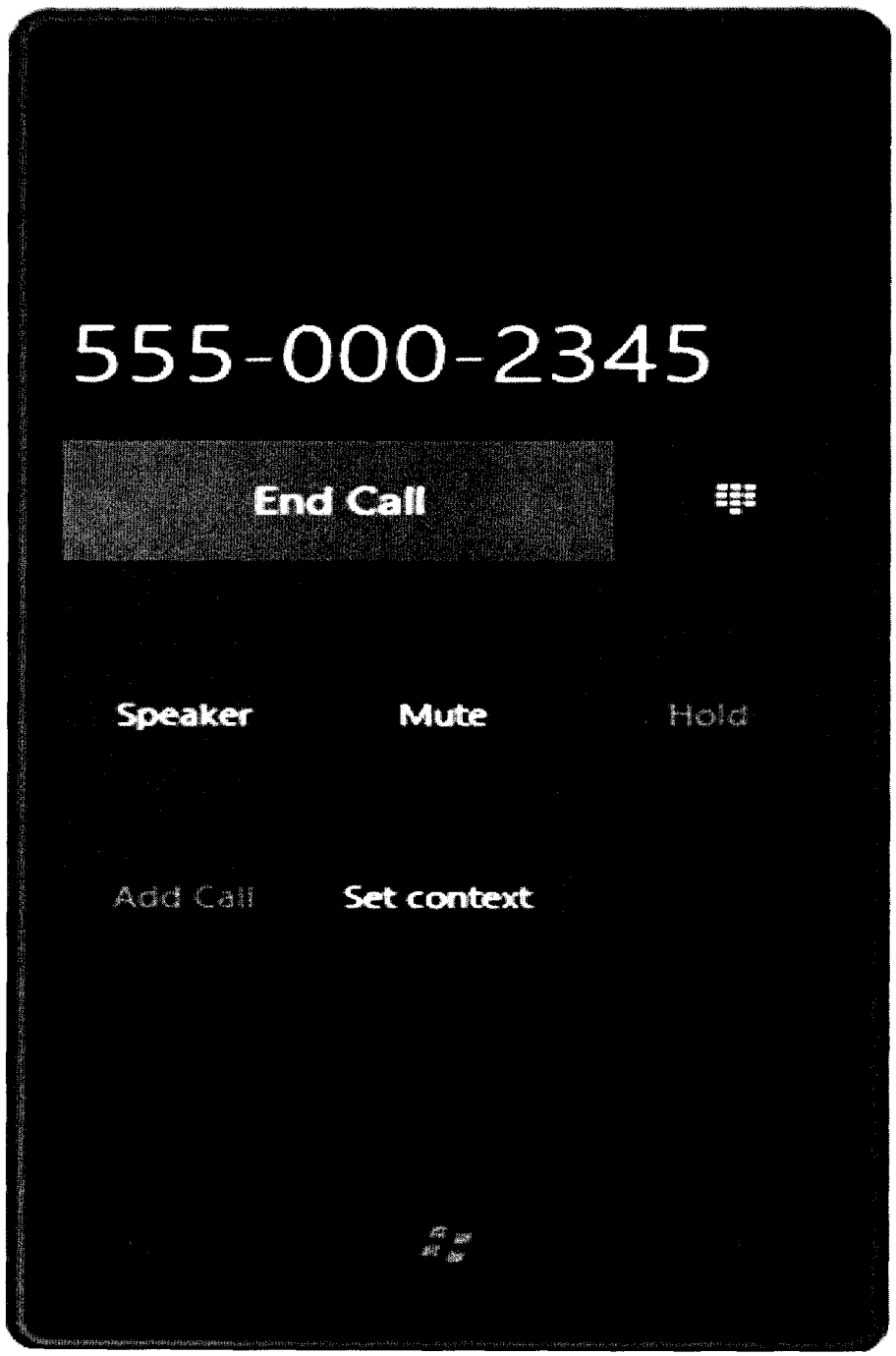
FIG. 16 illustrates an actual screen shot corresponding to the example screen shot illustrated in FIG. 11.

FIG. 16 illustrates an actual screen shot corresponding to the example screen shot illustrated in FIG. 11.

Figure 17:
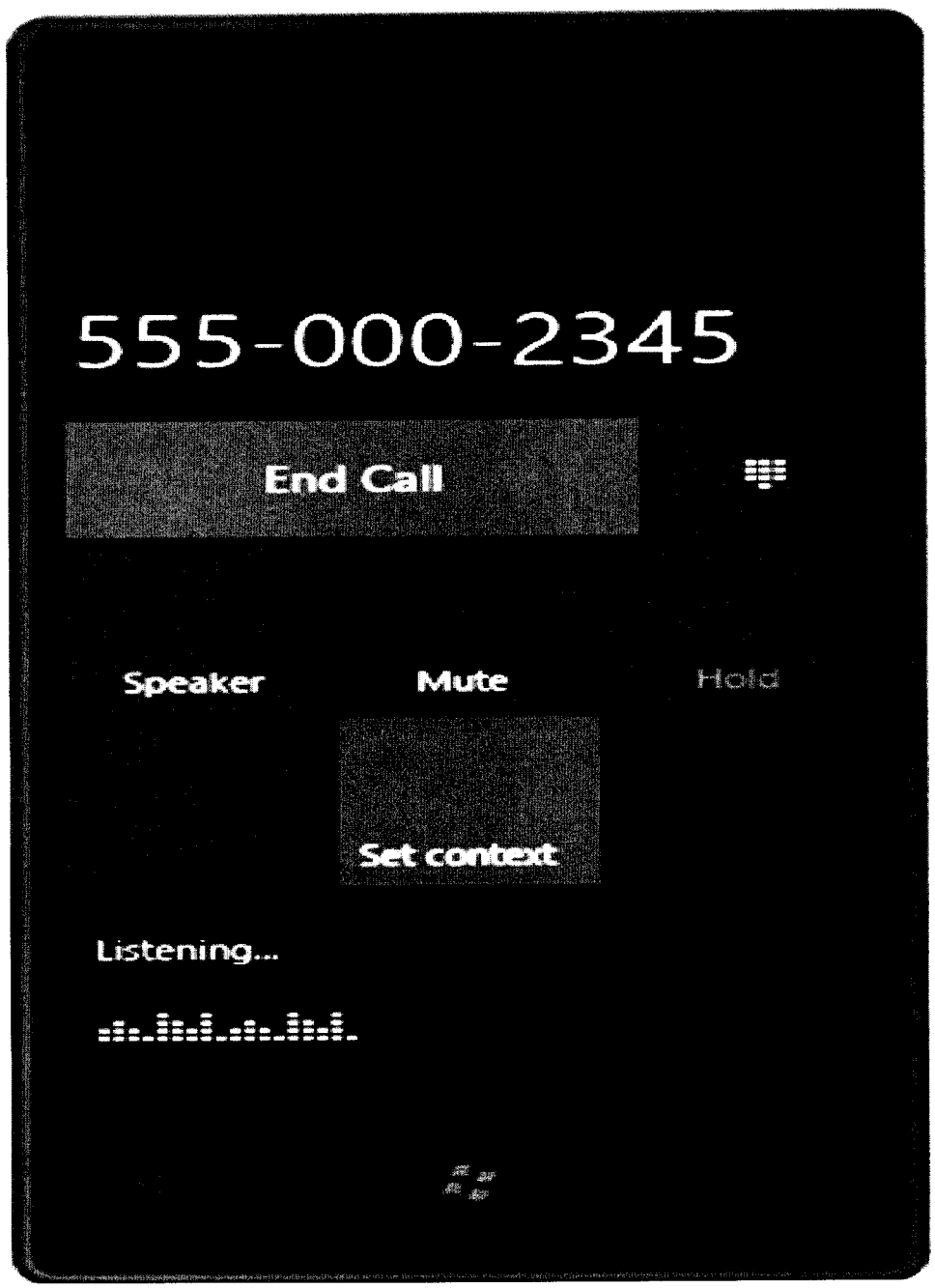
FIG. 17 illustrates an actual screen shot corresponding to the example screen shot illustrated in FIG. 12.

FIG. 17 illustrates an actual screen shot corresponding to the example screen shot illustrated in FIG. 12.

Figure 18:
FIG. 18 illustrates an actual screen shot corresponding to the example screen shot illustrated in FIG. 13.

FIG. 18 illustrates an actual screen shot corresponding to the example screen shot illustrated in FIG. 13.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for communicating phone call context information in an integrated, single interruption, comprising:
in a receiving device,
upon determining that the receiving device is receiving an incoming call:
acquiring, using the receiving device, from a telephony system, as part of the incoming call, an identifier of an initiator of the incoming call;
acquiring, using the receiving device, from a system other than the telephony system, context setting data associated with the incoming call, where acquiring the context setting data is performed at least partially in parallel with acquiring the identifier of the initiator of the incoming call, and
presenting, using the receiving device, the context setting data associated with the incoming call as an integrated presentation that produces a single interruption;
where the incoming call originated from a sending device that provided, at least partially in parallel, the identifier of the intended receiver of the outgoing call using a first communication modality and the context setting data associated with the outgoing call using a second, different communication modality.

2. The method of claim 1, where the communication system is the telephony system.

3. The method of claim 1, where the communication system is independent of the telephony system.

4. The method of claim 1, where the context setting data associated with the outgoing call includes, video-based data, or voice-based data.

5. The method of claim 4, comprising:
controlling the sending device to convert the image based-data, the voice-based data, or the video-based data to text-based data before providing the context setting data associated with the outgoing call to the communication system.

6. The method of claim 1, where the context setting data associated with the incoming call includes text-based data converted from voice-based data, video-based data, image-based data, or voice-based data.

7. The method of claim 6, where acquiring the context setting data associated with the incoming call includes interacting with the telephony system or interacting with a data communication system independent of the telephony system.

8. The method of claim 7, where interacting with the data communication system is performed at least partially in parallel with interacting with the telephony system.

9. The method of claim 1, where acquiring the identifier of the intended receiver and acquiring the context setting data are performed using a single interface.

10. The method of claim 1, comprising:
acquiring caller information stored in the receiving device, where the caller information is associated with the identifier of the initiator of the incoming call, and
presenting the caller information as part of the integrated presentation,
where the identifier of the initiator of the incoming call, the context setting data associated with the incoming call, and the caller information are presented simultaneously through a single interface to produce a single interruption.

11. The method of claim 1, where the sending device or the receiving device is a telephone, a cellular telephone, a network telephone, a voice over Internet protocol device, or a satellite telephone, and where the telephony system is a cellular network, a voice over internet protocol (VoIP) telephony system, or a satellite telephony system.

12. A computer-readable storage medium storing computer-executable instructions that when executed by a computer control the computer to perform a method, the method comprising:
upon determining that a user is making an outgoing call:
controlling the computer to acquire an identifier of an intended receiver of the outgoing call;
controlling the computer to acquire context setting data associated with the outgoing call, where the context setting data associated with the outgoing call includes text-based data, video-based data, image-based data, or voice-based data;
controlling the computer to provide, in a first communication modality, the identifier of the intended receiver of the outgoing call to a telephony system configured to make a call to a receiving device associated with the identifier of an intended receiver of the outgoing call, and
controlling the computer to provide, in a second, different communication modality, the context setting data associated with the outgoing call to a communication system configured to make the context setting data available to the intended receiver of the outgoing call, where the communication system is the telephony system or a second communication system independent of the telephony system, where the communication system stores the context setting data, and where providing the context setting data associated with the outgoing call to the communication system is performed at least partially in parallel with providing the identifier of the intended receiver to the telephony system configured to make a call to the intended receiver,
and
upon determining that the device is receiving an incoming call:
controlling the device to acquire, in the first communication modality, from the telephony system, an identifier of an initiator of the incoming call;
controlling the device to acquire, at least partially in parallel with acquiring the identifier of the initiator of the incoming call, in the second communication modality, from a system independent of the telephony system, context setting data associated with the incoming call, where the context setting data associated with the incoming call includes text-based data, video-based data, image-based data, or voice-based data, and where acquiring the context setting data associated with the incoming call includes interacting with the telephony system and a data communication system independent of the telephony system,
controlling the device to present, simultaneously, using a single interface, in a manner that produces a single interruption, the context setting data associated with the incoming call, and the identifier of the initiator of the incoming call,
controlling the device to delete the identifier of the initiator of the incoming call or the context setting data associated with the incoming call from the device upon determining that the incoming call is completed, and controlling the device to store the identifier of the initiator of the incoming call or the context setting data associated with the incoming call upon determining that the incoming call will not be answered.

13. A telephony apparatus, comprising:
a processor;
a memory;
a set of logics that processes pre-call information for a voice call handled by the apparatus; and
an interface to connect the processor, the memory, and the set of logics;
the set of logics comprising:
    a first logic that supplements an outgoing voice call with outgoing pre-call information, where the outgoing pre-call information includes voice-based data, text-based data, image-based data, or video-based data, and where the first logic converts the outgoing pre-call information from a first data format to a second, different data format,
    a second logic that acquires incoming pre-call information associated with an incoming voice call, where the second logic converts incoming pre-call information from a first data format to a second, different data format, and
    a third logic that provides an interface for acquiring outgoing pre-call information and for presenting incoming pre-call information in a single interruption,
    where the outgoing pre-call information and the incoming pre-call information provide user-discernible information sufficient to establish context for the incoming call in a single interruption without answering the incoming call.

14. The apparatus of claim 13, where the first logic provides the outgoing pre-call information as part of the outgoing voice call using the same data communication used to make the outgoing call.

15. The apparatus of claim 13, where the first logic provides, at least partially in parallel, the outgoing pre-call information as part of a separate data communication in a different data mode than was used to make the outgoing voice call.

16. The apparatus of claim 13, where the second logic acquires, at least partially in parallel, the incoming pre-call information from the same data communication used to make the incoming voice call or to acquire, at least partially in parallel, the incoming pre-call information using a separate data communication than was used to make the incoming call.

17. The apparatus of claim 13, where the first logic acquires the pre-call information and initiates the outgoing voice call using a single interface, and where the second logic presents the pre-call information and provides the incoming voice call using a single interface.

18. The apparatus of claim 14, comprising a third logic:
    that controls the first logic to store the outgoing pre-call information using an Internet-based service, and
    that controls the second logic to retrieve the incoming pre-call information from the Internet-based service.

\* \* \* \* \*